(12) United States Patent
Morrison

(10) Patent No.: US 6,222,373 B1
(45) Date of Patent: Apr. 24, 2001

(54) METHOD AND APPARATUS FOR MONITORING THE INTEGRITY OF A GEOMEMBRANE LINER USING TIME DOMAIN REFLECTOMETRY

(75) Inventor: John L. Morrison, Idaho Falls, ID (US)

(73) Assignee: The United States of America as represented by the United States Department of Energy, Washington, DC (US)

(*) Notice: Subject to any disclaimer, the term of this patent is extended or adjusted under 35 U.S.C. 154(b) by 0 days.

(21) Appl. No.: 09/187,827

(22) Filed: Nov. 9, 1998

(51) Int. Cl.⁷ ..................................................... G01R 31/08
(52) U.S. Cl. ............................ 324/534; 324/532; 324/637
(58) Field of Search ................................. 324/532–535, 324/527, 528, 551, 71.1

(56) References Cited

U.S. PATENT DOCUMENTS

| | | | |
|---|---|---|---|
| 3,600,674 | * 8/1971 | Brea et al. | 324/557 |
| 3,981,181 | * 9/1976 | Ochiai | 73/40.5 R |
| 5,243,294 | * 9/1993 | Burnett | 324/535 |
| 5,270,661 | * 12/1993 | Burnett | 324/527 |
| 5,376,888 | * 12/1994 | Hook | 324/643 |
| 5,461,318 | * 10/1995 | Borchert et al. | 324/533 |
| 5,719,503 | * 2/1998 | Burnett | 324/534 |
| 5,726,578 | * 3/1998 | Hook | 324/643 |
| 5,729,123 | * 3/1998 | Jandrasits et al. | 324/71.1 |

* cited by examiner

Primary Examiner—Safet Metjahic
Assistant Examiner—Vincent Q. Nguyen
(74) Attorney, Agent, or Firm—Daniel D. Park; Robert J. Fisher; Paul A. Gottlieb

(57) ABSTRACT

Leaks are detected in a multi-layered geomembrane liner by a two-dimensional time domain reflectometry (TDR) technique. The TDR geomembrane liner is constructed with an electrically conductive detection layer positioned between two electrically non-conductive dielectric layers, which are each positioned between the detection layer and an electrically conductive reference layer. The integrity of the TDR geomembrane liner is determined by generating electrical pulses within the detection layer and measuring the time delay for any reflected electrical energy caused by absorption of moisture by a dielectric layer.

8 Claims, 3 Drawing Sheets

METHOD AND APPARATUS FOR MONITORING THE INTEGRITY OF A GEOMEMBRANE LINER USING TIME DOMAIN REFLECTOMETRY

The United States Government has rights in this invention pursuant to Contract Number DE-AC07-94ID13223 between the United States Government and Idaho Environmental and Engineering Laboratory, as represented by Lockheed Martin Idaho Technologies Company.

TECHNICAL FIELD

The present invention relates to a method and apparatus for monitoring the integrity of a geomembrane liner. In particular, the geomembrane liner is uniquely constructed to employ two-dimensional time domain reflectometry to detect and identify the location of a leak.

BACKGROUND OF INVENTION

In many industries, materials are stored in holding areas, either as waste or for future use. Due to the hazardous nature of certain materials, geomembrane liners, steel liners, or concrete liners may be installed along the boundaries of holding areas to create an impermeable barrier between the materials and the surrounding environment. For example, liners have been installed along the boundaries of landfills, surface impoundments, water reservoirs, tanks, and holding ponds to prevent the contained material from leaking into the soil and groundwater. Where the contained material is liquid or semi-liquid, the majority of facilities employ geomembrane liners, which are typically fabricated from large sheets of flexible material, such as plastic, and may be comprised of two or more layers.

Many systems have been developed to monitor the integrity of geomembrane liners and to discover and locate leaks by way of electrical detection systems. These systems generally require an electrically conductive medium either covering the liner or imbedded within the liner system. For example, U.S. Pat. No. 5,661,406 to Daily, et al. discloses a method for detecting and locating leaks in a liner using electrical potential and electrical resistance measurements in the subsurface around the periphery of the liner, under the liner, or within the material holding area. In each case, the contained material must be electrically conductive. In a first embodiment, Daily teaches exciting the contained material, which is electrically isolated from the sub-surface outside the containment area by an insulating geomembrane liner, to an electrical potential above the surrounding soil, and sensing any current flow through a leak in the liner by measuring the electrical potential at a series of electrodes placed within the contained material and/or in the surrounding soil. In a second embodiment, Daily teaches the use of electrical resistivity tomography (ERT) to detect leak points in a liner by constructing a base-line resistivity image for the surrounding sub-surface and comparing subsequent resistivity images. The electrical resistivity profile identifies changes in the subsurface electrical characteristics caused by the flow of a conductive liquid through the liner.

U.S. Pat. No. 5,288,168 to Spencer is an example of constructing the leak detection system within the geomembrane liner itself. Spencer discloses a thermoplastic liner having upper and lower plastic layers. The lower plastic layer is adapted to sufficiently conduct electricity to enable the detection of pin hole leaks in the liner for in situ electrical analysis, and the upper layer provides strength and support. Pin hole leaks are detected by moving a spark discharge probe along the upper surface of the liner and detecting a spark discharge between the probe and the conductive lower layer. In this way, the contained material is not required to be electrically conductive.

U.S. Pat. No. 4,947,470 to Darilek discloses the use of a two-layered liner with an inter-liner zone between the layers. The top and bottom layers are made from electrically resistive material, such as polyethylene, while the inter-liner zone contains a conductive material, such as water or moist sand. An electrode is placed within the impounded material, and a number of detectors are disposed in an array on one side of the liner. A voltage is impressed across the liner, and the detector array monitors for the presence of an electromagnetic field created by a current flowing through a leak in the liner. The leak is located with orthogonal measurements from selected detectors, and these measurements are used to geometrically locate the leak. U.S. Pat. No. 5,362,182 to Hergenrother teaches a similar multi-layer liner having an electrically conductive layer sandwiched between two electrically non-conductive insulating layers. Pairs of electrical contacts are embedded within the electrically conductive monitoring layer, and a resistivity meter is connected between any pair of contacts to measure resistivity changes in the layer caused by water seepage. Alternatively, a voltage unit is used to drive current through the conductive layer and changes in the current within the electrically conductive layer are monitored.

Time domain reflectometry (TDR), an electric analog to a radar system, is an electrical pulse testing technique historically developed to locate breaks in transmission cables by measuring the arrival time of reflected electrical energy. Coaxial TDR cables are usually constructed with a central metallic conductor surrounded by an electrically non-conductive insulating material (the dielectric), a metallic outer conductor surrounding the insulation, and a protective jacket. The cables have characteristic impedance determined by the thickness and type of insulating material between the cables. A change in the distance between the inner and outer conductors (e.g., a crimp or break in the cable) or a foreign substance in the insulating material (e.g., moisture) will change the impedance of the cable. Electromagnetic pulses generated along the cable are reflected by the greater impedance, and the time delay and wave shape of the reflected electrical energy is determinative of the location and severity of damage to the cable. An alternate embodiment of the TDR cable system is a transmission line comprised of a pair of parallel, spaced apart, electrically conductive wires, which are separated and surrounded by an insulating medium, and enclosed in a protective jacket.

"Cable-radar" TDR systems are used in many applications for detecting moisture, including sensing the level of fluid in a tank, soil conditions, leaking pipes, and discontinuities in pond liners. For example U.S. Pat. No. 5,648,724 to Yankielun, et al., discloses embedding a TDR transmission line in a serpentine pattern within a roof to detect the location of leaks. It is also known to dispose TDR transmission lines under a liner to detect leaks. Unfortunately, where the leaking fluid does not intersect the path of the transmission line, the leak will not be detected.

The present invention is a method and apparatus for detecting and locating leaks in a geomembrane liner that overcomes the problems associated with TDR transmission line systems by expanding the TDR cable technology to a two-dimensional TDR system that is uniquely applied to a specially designed geomembrane liner.

Therefore, in view of the above, a basic object of the present invention is to provide a geomembrane liner system designed to employ two-dimensional time domain reflectometry for in-situ monitoring of the integrity of the liner.

Another object of the present invention is to provide a reliable and efficient method and apparatus for detecting and locating leaks within a geomembrane liner using TDR.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentation and combinations particularly pointed out in the appended claims.

BRIEF SUMMARY OF THE INVENTION

The present invention is a time domain reflectometry (TDR) geomembrane liner having an interior electrically conductive layer, referred to as the detection layer, which is insulated by electrically non-conductive dielectric material and positioned between top and bottom exterior electrically conductive layers. The detection layer is a substantially uniform and continuous medium for transmitting generated and reflected pulses of electromagnetic energy. The insulating material has a known impedance which exhibits characteristic changes if penetrated by moisture. The exterior electrically conductive layers serve as references. The periphery of the liner is terminated with an absorbent material that matches the characteristic impedance of the liner. Upon installation of the TDR geomembrane liner, the impedance of the geomembrane liner and the corresponding propagation velocity of a generated pulse of electromagnetic energy within the detection layer is measured by a pulse generator-receiver device.

To detect a leak in the TDR geomembrane liner, the pulse generator-receiver device is used to perform systematic measurements of the impedance of the geomembrane liner. The pulse generator-receiver device generates high frequency electrical pulses that radiate from the device in the form of two-dimensional electromagnetic waves within the detection layer. When discontinuities, such as moisture, penetrate the insulating material surrounding the detection layer, the impedance of the geomembrane liner changes and fractions of the electrical energy of the generated pulses are reflected within the detection layer by the discontinuity. The pulse generator-receiver device detects the reflected electrical energy and records the time delay for each wave-pulse to be generated, reflected, and received. The magnitude of reflected electrical energy is indicative of a discontinuity, or leak, in the liner.

To determine the location of the discontinuity, at least three points are selected for measurement along the liner's periphery. The pulse generator-receiver device is positioned at the first point, and the time delay for the wave-pulses to be generated, reflected and received at the first point is recorded. Time delay measurements are similarly recorded at the second and third points. Using the known impedance characteristics of the liner, the known velocity of the propagated wave-pulses, and the recorded time delay measurements, the radial distances from each of the three points to the discontinuity in the liner is determined. The intersection of the arcs at the determined radial distances identifies the position of the discontinuity in the TDR geomembrane liner.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE INVENTION

The present invention relates to a two-dimensional time domain reflectometry (TDR) system for detecting and locating a discontinuity or deterioration, such as a leak, in a specially designed geomembrane liner.

Figure 1:
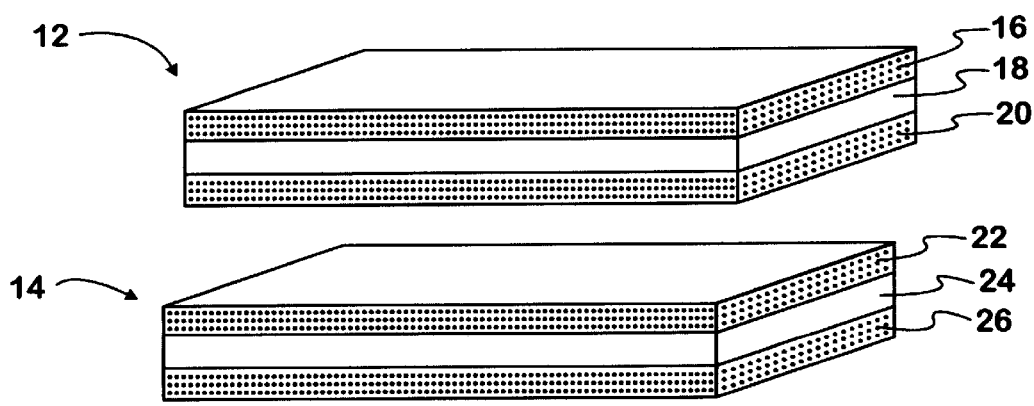
FIG. 1 shows the preferred embodiment of the invention, including two composite sheets that together comprise the time domain reflectometry (TDR) geomembrane liner.
Figure 2:
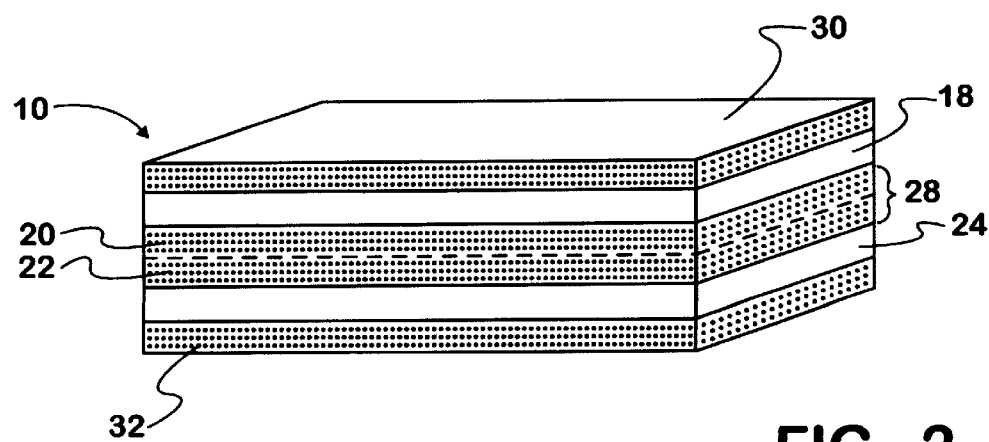
FIG. 2 shows the preferred embodiment of the TDR geomembrane liner.

FIGS. 1 and 2 illustrate the preferred construction of the TDR geomembrane liner. FIG. 1 shows the fabrication of the TDR geomembrane liner as a composite of two distinct sheets 12, 14, each having the same three-layered construction: an electrically conductive top layer 16, 22, an electrically non-conductive intermediate layer 18, 24, and an electrically conductive bottom layer 20, 26. The intermediate electrically non-conductive layers 18, 24, also referred to as dielectric or insulating layers, are made of insulating materials, such as PVC-foam or plastics, including high density polyethylene (PEHD).

As shown in FIG. 2, the two composite sheets 12, 14 are matched together by contacting the bottom electrically conductive layer 20 of the first sheet 12 with the top electrically conductive layer 22 of the second sheet 14 to form the TDR geomembrane liner 10. Preferably, the composite sheets 12, 14 are securely maintained together by an adhesive means known in the art, and any or all layers 16, 18, 20, 22, 24, 26 may be secured by known bonding means. By combining the composite sheets 12, 14, an interior electrically conductive layer 28, or detection layer, for the TDR geomembrane liner 10 results, which is comprised of the first sheet 12 bottom electrically conductive layer 20 and the second sheet 14 top electrically conductive layer 22. The detection layer 28 is a substantially uniform and continuous medium for conducting pulses of electromagnetic energy. The top electrically conductive layer 16 of the first sheet 12 and the bottom electrically conductive layer 26 of the second sheet 14 become the exterior top surface 30 and the exterior bottom surface 32 of the TDR geomembrane liner 10. Protective layers or jackets (not shown) may further be applied to the exterior surfaces 30, 32.

Figure 3:
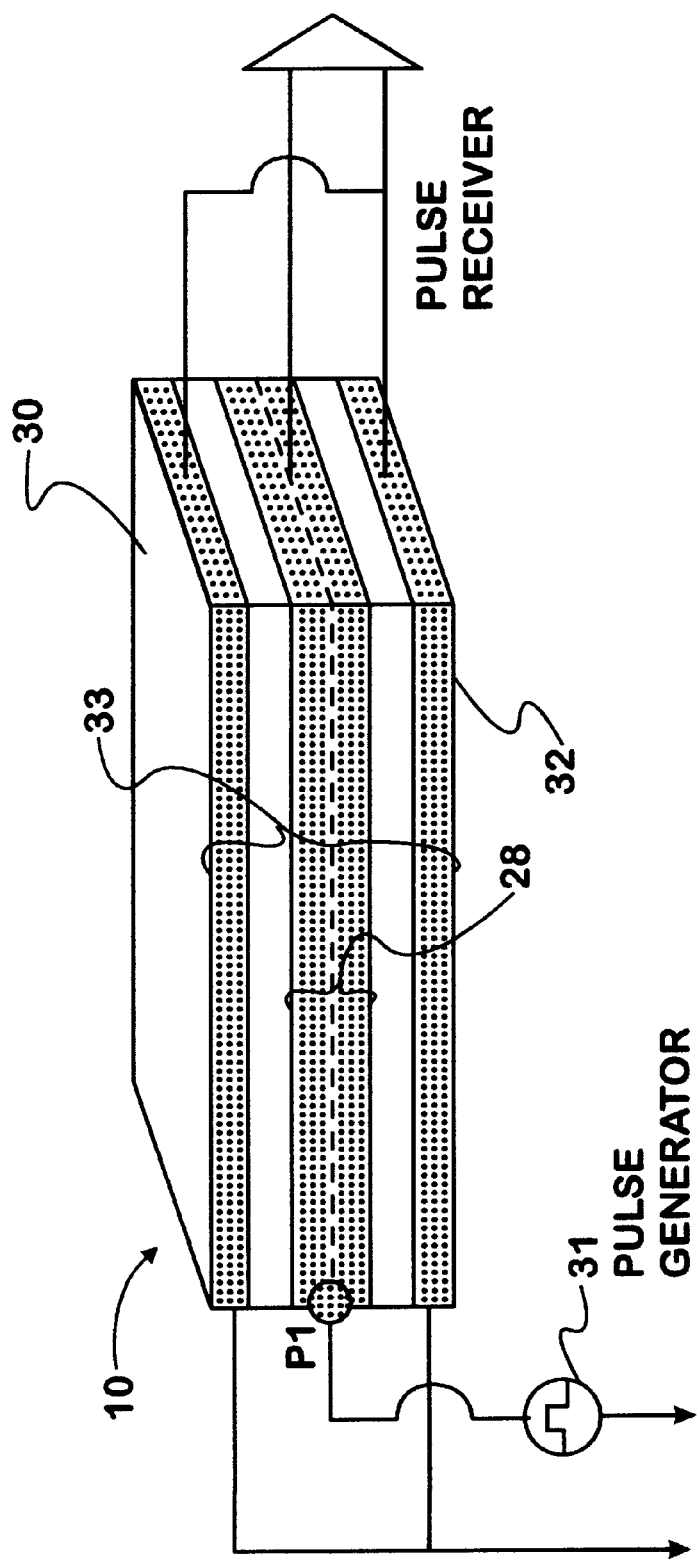
FIG. 3 illustrates the electrical circuitry for conducting a measurement at a selected point along the periphery of the TDR geomembrane liner using a pulse generator-receiver.

As shown in FIG. 3, during detection of a discontinuity, degradation, and/or moisture in the liner, the exterior conducting layers 30, 32 are electrically connected and become a ground reference for the system, while the detection layer 28 of the geomembrane liner is excited relative to the ground reference. The impedance of the TDR geomembrane liner 28 and the corresponding propagation velocity ($V_p$) of electromagnetic energy within the detection layer 28 is measured by a pulse generator-receiver device. The periphery 33, or edge, of the geomembrane liner is terminated with an absorbent material-34 (see FIG. 4) that matches the characteristic impedance of the TDR geomembrane liner 10, so that any generated electromagnetic wave-pulses radiating through the detection layer 28 of the geomembrane liner are not reflected at the periphery, but rather absorbed.

To detect a discontinuity, such as a leak, within the TDR geomembrane liner, systematic measurements are performed by using a pulse generator-receiver at various points along the liner's periphery. The pulse generator-receiver device generates high frequency electrical pulses that radiate from the device within the detection layer 28 in the form of electromagnetic wave-pulses. Any significant moisture penetrating either of the intermediate electrically non-conducting insulating layers 18, 24 is absorbed by the insulating material of these dielectric layers 18, 24, causing the region surrounding the moisture penetration to become saturated. The saturation of the insulating layers 18, 24, which are in contact with the detection layer 28, changes the impedance of the detection layer 28. As a result, a fraction of the electromagnetic energy of the pulse is reflected within the detection layer 28 by the discontinuity toward the point of its generation and received by the pulse generator-receiver device. The magnitude of the reflected electromagnetic energy is used to determine the existence of a leak in the TDR geomembrane liner.

Figure 4:
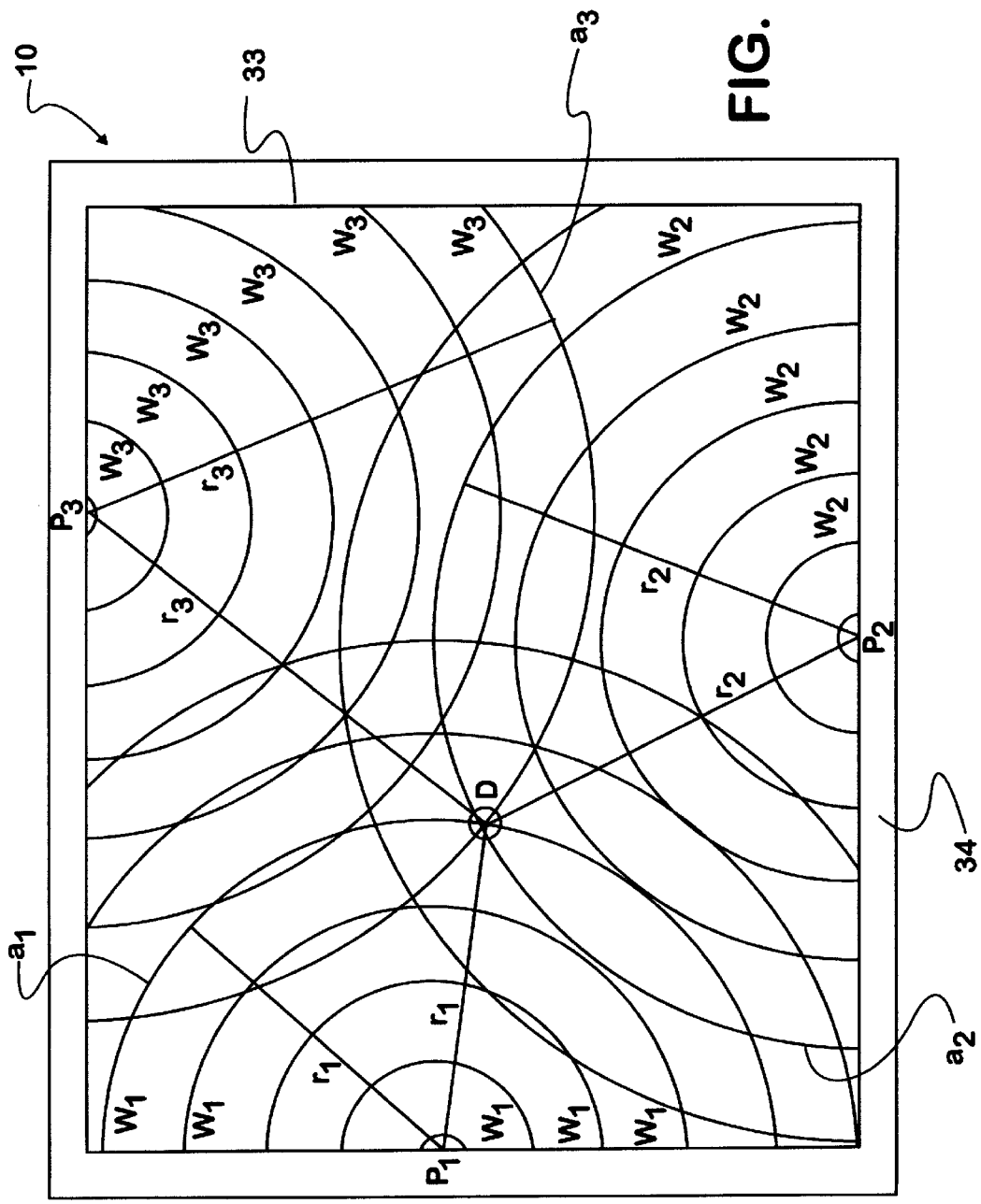
FIG. 4 shows a representation of the wave-pulses generated at three points along the periphery of the TDR geomembrane liner.

To detect the location of the discontinuity, e.g., leak, in the TDR geomembrane liner 10, the pulse generator-receiver device (not shown) is positioned at a first point $P_1$ along the periphery 33 of the TDR geomembrane liner 10, as illustrated in FIG. 4. As described above, the pulse generator-receiver device generates high frequency electrical pulses that radiate from the device within the detection layer 28 in the form of electromagnetic wave-pulses $w_1$. The presence of a discontinuity D in the liner, such as moisture, causes a fraction of the electromagnetic energy of the pulse $w_1$ to be reflected (not shown) toward the point of its generation $P_1$. By measuring the time delay for a pulse to be generated, reflected, and returned to the pulse generator-receiver device $P_1$, the radial distance $r_1$ from the pulse generator-receiver device to the discontinuity D is determined, and a radial arc $a_1$ identified.

Next, in the same manner, a second point $P_2$ is selected for measuring the time delay for an electromagnetic wave pulse $w_2$ to be generated, reflected, and returned to the pulse generator-receiver device. The radial distance $r_2$ from the pulse generator-receiver device at point $P_2$ to the discontinuity D is determined, and a radial arc $a_2$ is identified. Finally, a third point $P_3$ is selected for measuring the time delay for an electromagnetic pulse $W_3$ to be generated, reflected, and returned to the pulse generator-receiver device, the radial distance $r_3$ from the pulse generator-receiver device at point $P_3$ to the discontinuity D is determined, and a radial arc $a_3$ is identified. The intersection of arcs $a_1$, $a_2$, and $a_3$ is determinative of the location of the discontinuity D in the TDR geomembrane liner.

Advantageously, the TDR geomembrane liner overcomes the difficulties experienced with traditional TDR cable systems, in that the discontinuity is not required to be coincident with a cable, nor is the contained material required to be an electrically conductive medium.

After installation and prior to leak detection, the initial electrical reflectivity of electromagnetic waves within the detection layer of the TDR geomembrane liner is preferably characterized to serve as a reference, by using means for applying pulses and means for receiving corresponding reflections, such as a pulse generator-receiver device, to perform systematic measurements at various points at the periphery of the liner, such that any leak subsequently formed in the liner is more easily identifiable by a comparison between the reference electrical reflectivity profile and subsequent leak detection measurements.

It is understood by those skilled in the art that the TDR geomembrane liner may be comprised of various multiple layers, including protective layers or jackets. For example, the TDR geomembrane liner may be constructed such that the interior electrically conductive layer (i.e. the detection layer) is made from a single substantially uniform layer of electrically conductive material, rather than two distinct electrically conductive sheets matched together and in integral contact, as described in the preferred embodiment. Electrically conductive layers comprising the TDR geomembrane liner should be chemically inert to reduce the possibility of corrosion. Minor discontinuities in the TDR geomembrane liner, such as a wrinkle, results in reflected electromagnetic energy within the detection layer having characteristics that are distinguishable from the characteristics of reflected electromagnetic energy caused by more serious breaches in the integrity of the liner system, including a leak. The TDR geomembrane liner layers and composite sheets are manufactured by methods known in the art, including forming flexible panels and assembling the panels into sheets.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. While the invention has been described with reference to details of the illustrated embodiment, these details are not intended to limit the scope of the invention, rather the scope of the invention is to be defined by the claims appended hereto.

The embodiments of the invention in which an exclusive property or privilege is claimed are defined as follows:

1. A method of determining the integrity of a two-dimensional time-domain-reflectometry geomembrane liner and determining the location of a deterioration of the liner, comprising the steps of:

providing the liner having a substantially uniform electrically conductive detection layer;

generating a first electrical pulse within the detection layer at a first point of generation, whereby a fraction of the first electrical pulse is reflected by a change of impedance in the liner; and receiving the fraction of the first electrical pulse reflected within the detection layer:

measuring the duration of time from the generation of the first electrical pulse to the receipt of the reflected first electrical pulse to determine a first point of reflection for the first electrical pulse;

approximating a first radial distance between the first point of generation and the first point of reflection, whereby the approximated first radial distance describes an approximate first arc within the detection layer;

generating a second electrical pulse within the detection layer at a second point of generation, whereby a fraction of the second electrical pulse is reflected by the change of impedance in the liner;

receiving the fraction of the second electrical pulse reflected within the detection layer;

measuring the duration of time from the generation of the second electrical pulse to the receipt of the reflected second electrical pulse to determine a second point of reflection for the second electrical pulse;

approximating a second radial distance between the second point of generation and the second point of reflection, whereby the approximated second radial distance describes an approximate second arc within the detection layer;

generating a third electrical pulse within the detection layer at a second point of generation, whereby a fraction of the third electrical pulse is reflected by the change of impedance in the liner;

receiving the fraction of the third electrical pulse reflected within the detection layer; measuring the duration of time from the generation of the third electrical pulse to the receipt of the reflected third electrical pulse to determine a third point of reflection for the third electrical pulse;

approximating a third radial distance between the third point of generation and the third point of reflection, whereby the approximated third radial distance describes an approximate third arc within the detection layer; and determining the intersection of the first, second, and third approximated arcs to approximate the location of the deterioration of the liner.

2. A two-dimensional time-domain-reflectometry geomembrane liner, comprising:

a substantially uniform and continuous electrically conductive detection layer for conducting electromagnetic energy, said detection layer having a top surface and a bottom surface;

first and second electrically conductive reference layers;

a first electrically non-conductive insulating layer disposed between the top surface of said detection layer and the first reference layer;

a second electrically non-conductive insulating layer disposed between the bottom surface of said detection layer and the second reference layer;

means for generating a pulse of electromagnetic energy within said detection layer; and means for receiving any reflected electromagnetic energy of the generated pulse, whereby electromagnetic energy is reflected at a location in the liner where a change in impedance has occurred.

3. The geomembrane liner of claim 2 further comprising at least three points along the periphery of the liner for positioning said pulse generating means and said reflected electromagnetic energy receiving means.

4. The geomembrane liner of claim 2, further comprising means for measuring the time between electromagnetic pulse generation and corresponding reflected electromagnetic energy reception at each of said points, whereby radial distances from each of said points to the location of the change in impedance are approximated and thereby describe arcs, such that the intersection of the arcs approximately determines the position of the change in impedance within the geomembrane liner.

5. The geomembrane liner of claim 2, further comprising electrically absorbent material at the periphery of said detection layer, whereby generated pulses of electromagnetic energy are absorbed and not reflected by the periphery of the detection layer.

6. The geomembrane liner of claim 2, whereby the insulating layer is comprised of thermoplastic material.

7. The geomembrane liner of claim 2, further comprising first and second exterior protective layers adjacent said first and second reference layers.

8. The exterior protective layers of claim 7, whereby said protective layers are comprised of thermoplastic material.

* * * * *